ус011147207B2

United States Patent
Thompson

(10) Patent No.: US 11,147,207 B2
(45) Date of Patent: Oct. 19, 2021

(54) SYSTEM AND METHOD FOR AUTOMATIC TANK METERING CONTROL

(71) Applicant: CNH INDUSTRIAL CANADA, LTD., Saskatoon (CA)

(72) Inventor: Dennis George Thompson, Eagle Ridge (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 138 days.

(21) Appl. No.: 16/261,140

(22) Filed: Jan. 29, 2019

(65) Prior Publication Data

US 2020/0236841 A1    Jul. 30, 2020

(51) Int. Cl.
| | |
|---|---|
| *A01C 7/10* | (2006.01) |
| *A01C 1/04* | (2006.01) |
| *A01C 7/18* | (2006.01) |

(52) U.S. Cl.
CPC ............... *A01C 7/105* (2013.01); *A01C 1/04* (2013.01); *A01C 7/18* (2013.01); *A01C 2001/048* (2013.01)

(58) Field of Classification Search
CPC ........... A01C 7/105; A01C 7/18; A01C 7/102; A01C 7/10; A01C 7/08; A01C 7/00; A01C 1/04; A01C 1/00; A01C 2001/048
See application file for complete search history.

(56) References Cited

U.S. PATENT DOCUMENTS

| | | |
|---|---|---|
| 6,584,920 B1 | 7/2003 | Cresswell |
| 7,448,335 B2 | 11/2008 | Wilson |
| 8,015,884 B1 | 9/2011 | Carr et al. |
| 8,032,255 B2 | 10/2011 | Phelan et al. |
| 8,408,478 B2 | 4/2013 | Wonderlich |
| 8,695,396 B2 | 4/2014 | Landphair et al. |
| 8,903,545 B2 | 12/2014 | Riffel et al. |
| 9,578,800 B2 | 2/2017 | Beaujot et al. |
| 9,591,799 B2 | 3/2017 | Henry |
| 9,739,654 B2 | 8/2017 | Binsirawanich et al. |
| 9,801,330 B2 | 10/2017 | Bent et al. |
| 9,839,177 B2 | 12/2017 | Kowalchuk |
| 9,936,626 B2 | 4/2018 | Chahley et al. |
| 2014/0076047 A1 | 3/2014 | Liu et al. |
| 2016/0135359 A1* | 5/2016 | Kowalchuk ............ A01C 7/102 111/149 |
| 2016/0245678 A1 | 8/2016 | Yang et al. |

FOREIGN PATENT DOCUMENTS

EP      2819500 A1    1/2015

* cited by examiner

*Primary Examiner* — Christopher J. Novosad
(74) *Attorney, Agent, or Firm* — Rebecca L. Henkel; Rickard K. DeMille

(57) ABSTRACT

A product distribution control system for an agricultural system includes a controller including a memory and a processor. The controller is configured to receive a signal indicative of an amount of product in a tank of an air cart and to automatically adjust the metering rate of the product from the tank or the tank pressurization based on the amount of product in the tank.

8 Claims, 2 Drawing Sheets

SYSTEM AND METHOD FOR AUTOMATIC TANK METERING CONTROL

BACKGROUND

The disclosure relates generally to an agricultural product distribution system, and more particularly, to controlling the metering of a granular product based on the level of granular product in a corresponding tank.

Generally, a seeding implement (e.g., a seeder) may be towed behind an off-road vehicle, such as a tractor, via a mounting bracket secured to a rigid frame of the seeding implement. The seeding implement may include multiple row units distributed across a width of the implement. More specifically, each row unit may deposit seeds at a desired depth beneath the soil surface of a field as the seeding implement is towed. For example, each row unit may include a ground engaging tool or opener that forms a seeding path (e.g., trench) into the soil. A seed tube may then deposit a granular product, such as seeds and/or fertilizer, into the trench. As the row unit travels through the field, closing discs may move excavated soil back into the trench covering the granular product. In this manner, rows of seeds may be planted.

In certain configurations, the granular product may be delivered to the row units of the seeding implement from a centralized location, such as an air cart. The air cart may generally include a seed storage tank (e.g., a pressurized tank), an air source (e.g., a blower), and a metering assembly. More specifically, the granular product may be gravity fed from the storage tank into the metering assembly, which distributes a desired flow rate of the granular product to each of the row units. For example, the air source may generate an air stream and the metering assembly may control flow of seeds into the air stream such that the seeds are entrained in the air stream. The air stream may then be supplied to each of the row units via primary lines fluidly coupled between the metering assembly and the row units, thereby delivering the granular product to each of the row units.

Granular metering performance (i.e., the quantity of product metered per revolution) may vary depending on how much product is loaded within the storage tank. Vertical weight or pressure from the product column height in the tank may also affect the product meter dispensing rate. This variability in the product height also affects an amount of resistance to air flowing through the product into the meter for systems with pressurized tanks. In particular, a greater amount of product within the storage tank may have a greater flow resistance, while a lesser amount of product has a lesser flow resistance. Therefore, a higher airflow may contribute to increasing an amount of product dispensed per revolution and an over-application of product via "blow-by". This may be more important with regard to smaller particles or light weight products such as canola or granular inoculants. Typically to reduce or avoid over-application, meters have tight clearances between the meter roller and housing.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the disclosure. Indeed, the disclosure may encompass a variety of forms that may be similar to or different from the embodiments set forth below.

In one embodiment, a product distribution control system for an agricultural system is provided. The product distribution control system includes a controller including a memory and a processor. The controller is configured to receive a signal indicative of an amount of product in a tank of an air cart and to automatically adjust the metering rate of the product from the tank based on the amount of product in the tank.

In another embodiment, a method of controlling a product distribution system for an agricultural system is provided. The method includes receiving, at a controller, a signal indicative of an amount of product in a tank of an air cart. The method also includes automatically adjusting, via the controller, a metering rate of the product from the tank based on the amount of product in the tank.

In a further embodiment, a tangible, non-transitory computer-readable medium is provided. The computer readable medium includes instructions stored thereon that, when executed, by a processor, are configured to cause the processor to receive a signal indicative of an amount of product in a tank of an air cart and to automatically adjust the metering rate of the product from the tank based on the amount of product in the tank.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
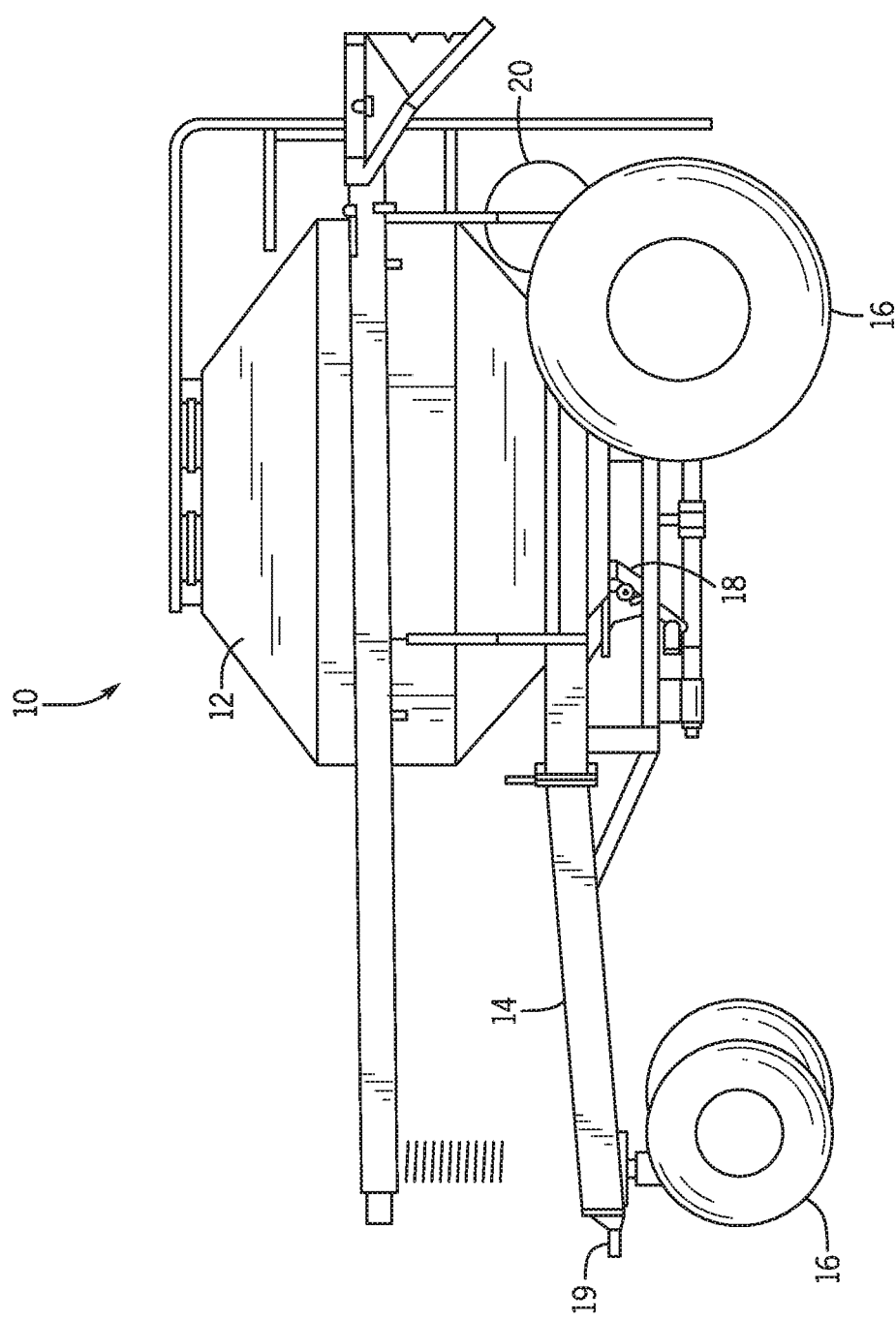
FIG. 1 is a side view of an air cart, including an agricultural product distribution system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Generally an agricultural product distribution system may include a towable agricultural implement to deposit a granular product into the soil. As used herein, the granular product may be any suitable particulate material that is desired to be deposited into the ground, such as various types of seeds and fertilizers. However, to simplify the following discussion, the product will be described as seeds. Nevertheless, one or ordinary skill in the art would recognize that the techniques described herein may be easily adapted for use with other products.

More specifically, the agricultural implement may include row units that open the soil, dispense the granular product into the soil opening, and re-close the soil as the agricultural implement is towed across a field, for example, by an off-road work vehicle, such as a tractor. Additionally, the agricultural product distribution system may include an air cart that distributes the granular product to the row units on the agricultural implement. More specifically, in some embodiments, a metering assembly on the air cart may pneumatically distribute the granular product to the row units. For example, the metering assembly may control output of the granular product from a storage tank into an air stream, which is then delivered to the row units via pneumatic lines (e.g., including a primary line coupled to the air cart) that fluidly connect the metering assembly to the row units.

Granular metering performance (i.e., the quantity of product metered per revolution) may vary depending on how much product is loaded within the storage tank. Vertical weight or pressure from the product column height in the tank may affect the product meter dispensing rate. This variability in the product height also affects an amount of resistance to air flowing through the product into the meter for systems with pressurized tanks. In particular, a greater amount of product within the storage tank may have a greater flow resistance, while a lesser amount of product has a lesser flow resistance. Therefore, a higher airflow may contribute to increasing an amount of product dispensed per revolution and an over-application of product via "blow-by". This may be more important with regard to smaller particles or light weight products such as canola or granular inoculants. Typically to reduce or avoid this over-application, meters have tight clearances between the meter roller and meter housing.

Accordingly, as will be described in more detail below, embodiments described herein may provide a control system to improve overall metering system accuracy. For example, one embodiment includes a controller (e.g., air cart controller) that receives a signal indicative of an amount of granular product within a storage tank of an air cart (or any agricultural equipment with a storage tank). The signal may be indicative of a weight of the granular product or a height of the granular product within the storage tank. The controller may adjust the metering rate of granular product based on the amount of granular product within the storage tank. In certain embodiments, adjusting the metering rate includes adjusting a metering device or metering assembly coupled to the storage tank. In other embodiments, adjusting the metering rate includes adjusting an airflow (e.g., via an airflow fan or valve) into the storage tank to adjust the pressure within the tank. In certain embodiments, the metering rate of the granular product may be automatically, continuously adjusted based on changes in the amount of product within the storage tank during field operation. In other embodiments, the metering rate of the granular product may be automatically, intermittently (or occasionally) adjusted based on the amount of granular product within the storage tank reaching specific levels (¾ full, ½ full, etc.). The disclosed embodiments of the control system may enable a more consistent application rate of the granular product throughout the area seeded. In addition, the control system may enable the utilization of meters with increased clearances (relative to the housing) to reduce potential seed damage.

To help illustrate, a side view of an air cart 10 that may be used in conjunction with a towable agricultural implement to deposit seeds into the soil is shown in FIG. 1. More specifically, the air cart 10 may be used to centrally store seeds and distribute the seeds to the agricultural implement. Accordingly, in the illustrated embodiment, the air cart 10 includes a storage tank 12, a frame 14, wheels 16, a metering assembly 18, and an air source 20. In the depicted embodiment, the air cart frame 14 may be coupled to the agricultural implement or an off-road work vehicle via a hitch 19. As such, the wheels 16 may contact the soil surface to enable the air cart 10 to be towed.

Additionally, the storage tank 12 may centrally store the seeds before distribution. In some embodiments, the storage tank 12 may include multiple compartments for storing various flowable granular products. For example, one compartment may include seeds, such as canola or wheat, and another compartment may include a dry fertilizer. In such embodiments, the air cart 10 may distribute the seeds, the fertilizer, or a mixture thereof to the agricultural implement.

Furthermore, as depicted, the metering assembly 18 is coupled to the bottom of the storage tank 12. More specifically, the metering assembly 18 may enable seeds stored in the storage tank 12 to be gravity fed into the metering assembly 18. The metering system 18 may then control the flow of seeds into an air stream generated by the air source 20, thereby controlling seed distribution to the row units for deposition into the soil. In some embodiments, the air source 20 may be a pump or blower powered by an electric or hydraulic motor, for example.

Figure 2:
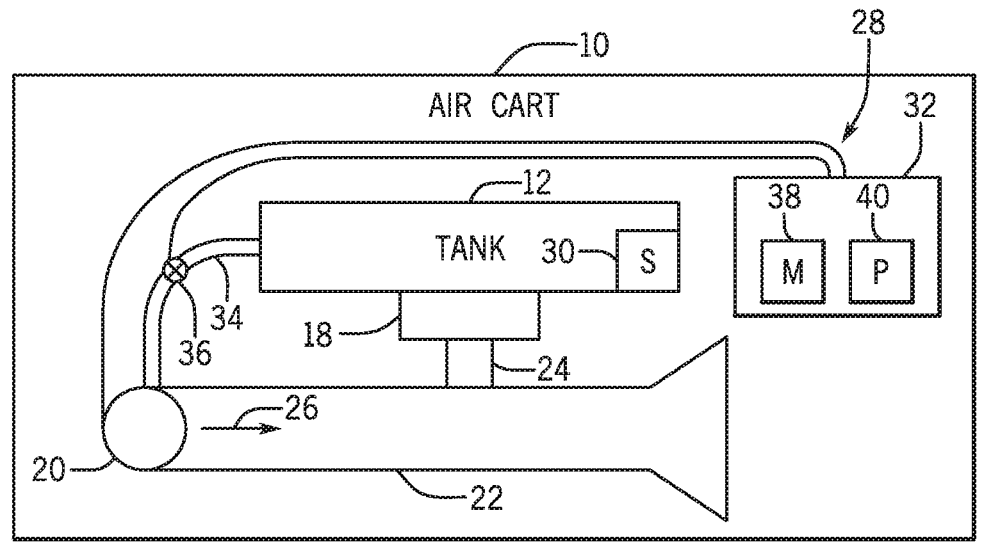
FIG. 2 is a schematic view of the agricultural product distribution system of FIG. 1, in accordance with an embodiment.

To more clearly illustrate, a schematic view of the air cart 10 is provided in FIG. 2. As illustrated, the air cart 10 includes the storage tank 12. In certain embodiments, the air cart 10 includes multiple storage tanks or compartments. The storage tank 12 is associated with the metering assembly or device 18 that meters the granular product from the storage tank 12. In embodiments with multiple storage tanks, each tank is associated with a respective metering device and the respective granular product may be individually metered as described below. The storage tank 12 is coupled to a conduit 22 (e.g., primary line) via conduit 24 (e.g., secondary conduit). The granular product from the storage tank 12 may be entrained in the airflow 26 from the air source 20 within the conduit 22.

The air cart 10 includes a product distribution control system 28. The product distribution control system 28 includes one or more sensors 30 associated with (e.g., coupled to or disposed within) the storage tank 30. The one or more sensors 30 are configured to measure an amount of granular product within the storage tank 12. In certain embodiments, the one or more sensors 30 may include an electronic sensor configured to determine a height of the granular product within the storage tank 12. In some embodiments, given a set volume for the storage tank 12, the volume of the granular product within the storage tank 12 may be determined from the height. In certain embodiments, the one or more sensors 30 may include a load sensors to determine the weight of the granular product within the storage tank 12.

The product distribution control system 28 includes a controller 32 coupled to the one or more sensors 30 (e.g., via a wired or wireless connection). The controller 32 is configured to receive feedback or signals from the one or more sensors indicative of the amount of granular product (e.g., height, weight, volume, etc.) within the storage tank 12. Based on the feedback (i.e., amount of product in the storage tank 12) from the one or more sensors 30, the controller 32 is configured to automatically adjust a metering rate of the granular product from the storage tank 12. In certain embodiments, the controller 32 may automatically continuously adjust the metering rate in response to the feedback from the one or more sensors 30. Thus, as the amount of product within the storage tank 12 changes, the metering rate of the product from the storage tank 12 changes. In certain embodiments, the controller 32 may automatically intermittently or occasionally adjust the metering rate of the product from the storage tank 12 in response to the feedback from the one or more sensors. In particular, the metering rate of the product from the storage tank 12 may only be altered upon the amount of product within the storage tank 12 meeting specific levels. For example, as a product level changes in the tank 12 from full to ¾ full to ½ full and so forth until empty, the metering rate may only be changed upon reaching these different levels.

In certain embodiments, the controller 32 automatically adjusts the metering rate of the granular product from the storage tank 12 via a control signal provided to the metering device 18 to adjust the device 18 (e.g., speed). In certain embodiments, the controller 32 automatically adjusts the metering rate of the granular product from the storage tank 12 by automatically controlling the airflow to the storage tank 12 to adjust the pressure within storage tank 12 which affects the metering rate of the product. As depicted in FIG. 2, a pressurization line 34 is coupled to the storage tank 12 that provides airflow to the tank 12 from the air source 20 for pressurization of the tank 12. In certain embodiments, a valve 36 may be disposed along the pressurization line 34 and the controller 32 may provide a control signal to the valve 36 to actuate the valve 36 adjust the airflow (e.g., amount, flow rate, etc.) provided to the storage tank 12. In certain embodiments, the controller 32 may provide a control signal to a component of the air source 20 (e.g., air flow fan) to alter the airflow (e.g., amount, flow rate, etc.) provided to the storage tank 12.

In certain embodiments, the controller 32 may receive an input (e.g., user input) indicating the product type within the storage tank 12. Product levels may affect different products differently. In certain embodiments, the control parameters for adjusting the metering rate relative to product level may be different based on the product type. For example, smaller or lighter particles (e.g., canola) may require more compensation compared to larger or heavier particles (e.g., fertilizer, wheat or peas). In certain embodiments, empirical data may be gathered to determine the correct metering adjustment rate relative to the amount of product (e.g., height, weight, volume, etc.) for each specific product from which tables or algorithms may be generated. The controller 32 based on the input of the product type may obtain a particular table or algorithm specific to that product type for correctly adjusting the metering rate based on the changes in the amount of the product.

The controller 32 may include a memory 38 and a processor 40. In some embodiments, the processor 40 may include one or more general purpose processors, one or more application specific integrated circuits, one or more field programmable gate arrays, or the like. Additionally, the memory 38 may be any tangible, non-transitory, computer readable medium that is capable of storing instructions executable by the processor 40 and/or data that may be processed by the processor 40. In other words, the memory 38 may include volatile memory, such as random access memory, or non-volatile memory, such as hard disk drives, read only memory, optical disks, flash memory, and the like. The memory 38 may store tables or algorithms specific to one or more different product types for correctly adjusting the metering rate based on the amount of product in the storage tank 12.

Figure 3:
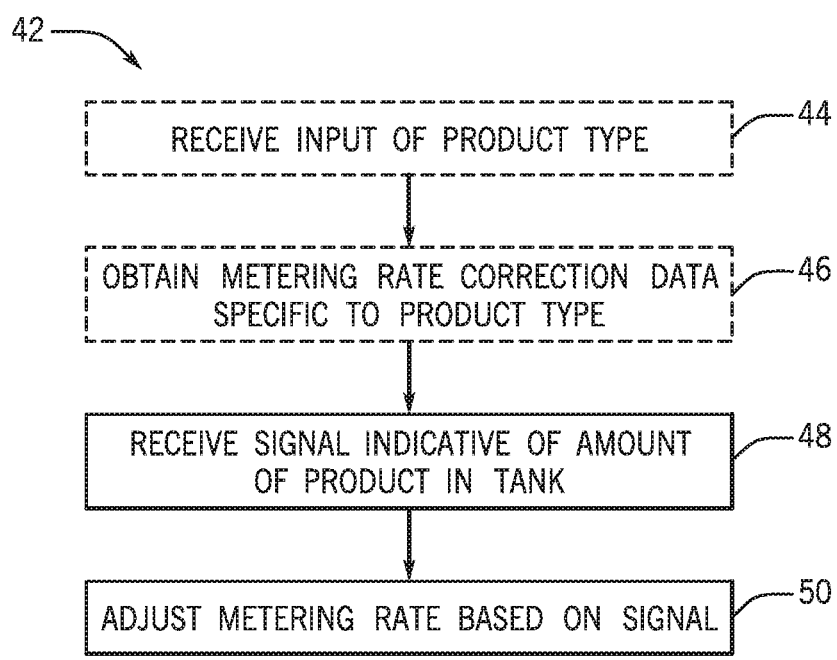
FIG. 3 is a flowchart of an embodiment of a method for adjusting a metering rate of a product based on an amount of the product in a tank, in accordance with an aspect of the present disclosure.

FIG. 3 is a flowchart of an embodiment of a method 42 for adjusting a metering rate of a product based on an amount of the product in the storage tank 12. The steps of the method 42 may be performed by the controller 32 of the air cart 10 described above. In certain embodiments, the method 42 includes receiving an input (e.g., from a user) of a product type within the storage tank 12 of the air cart 10 (block 44). In certain embodiments, the method 42 includes obtaining metering rate correction data specific to the product type within the storage tank 12 (block 46). For example, the controller 32 may access the memory 38 to obtain the table or algorithm specific to the product within the storage tank 12 for correctly adjusting the metering rate of the product based on the amount of the product within the tank 12.

The method 42 includes receiving a signal indicative of the amount of product in the storage tank 12 from the one or more sensors 30 (block 48). The signal may be indicative of a height of the product within the storage tank 12, a weight of the product within the storage tank 12, or a volume of the product within the storage tank 12. The method 42 also includes automatically adjusting a metering rate for the product within the storage tank 12 based on the signal (i.e., the amount of product within the tank 12) (block 50). In certain embodiments, the method 42 includes automatically, continuously adjusting the metering rate in response to the signal. In certain embodiments, the method includes automatically, intermittently or occasionally adjusting the metering rate of the product from the storage tank 12 in response to the signal (e.g., upon the amount of product within the storage tank 12 meeting specific levels). In certain embodiments, the method 42 includes automatically adjusting the metering rate of the granular product from the storage tank 12 via a control signal provided to the metering device 18 to adjust the device 18 as discussed above. In certain embodiments, the method 42 includes automatically adjusting the metering rate of the granular product from the storage tank 12 by automatically controlling the airflow to the storage tank 12 to adjust the pressure within storage tank which affects the metering rate of the product as discussed above.

While only certain features of the disclosure have been illustrated and described herein, many modifications and changes will occur to those skilled in the art. It is, therefore, to be understood that the appended claims are intended to cover all such modifications and changes as fall within the essence of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A product distribution control system for an agricultural system, comprising a controller comprising a memory and a processor, wherein the controller is configured to:
   receive a signal indicative of an amount of product in a storage tank of an air cart, wherein the storage tank is the initial storage location for the product in a product distribution system of the agricultural system; and
   automatically adjust a metering rate of the product from the storage tank based on the amount of product in the storage tank.

2. The product distribution control system of claim 1, comprising a sensor associated with the storage tank that is configured to measure the amount of product in the storage tank and to output the signal to the controller.

3. The product distribution control system of claim 1, wherein the amount of product in the storage tank is a weight of the product in the storage tank.

4. The product distribution control system of claim 1, wherein the amount of product in the storage tank is a height of the product in the storage tank.

5. The product distribution control system of claim 1, wherein the controller is configured to automatically, continuously adjust the metering rate based on the signal.

6. The product distribution control system of claim 1, wherein the controller is configured to automatically, intermittently adjust the metering rate based on the signal when the amount of product reaches specific levels.

7. The product distribution control system of claim 1, wherein automatically adjusting the metering rate of the product from the storage tank comprises adjusting a metering device coupled to the storage tank.

8. The product distribution control system of claim 1, wherein automatically adjusting the metering rate of the product from the storage tank comprises automatically adjusting an airflow into the storage tank to change a pressure in the storage tank.

* * * * *